United States Patent [19]

Moore

[11] 4,166,432

[45] Sep. 4, 1979

[54] METHOD FOR CONVERTING A DISPOSABLE STORAGE CONTAINER TO A BIRD NESTING BOX AND ARTICLES OF MANUFACTURE ASSOCIATED THEREWITH

[76] Inventor: Michael R. P. Moore, 11724 Lovejoy, Silver Spring, Md. 20902

[21] Appl. No.: 789,347

[22] Filed: Apr. 21, 1977

[51] Int. Cl.$^2$ ............................................. A01K 31/00
[52] U.S. Cl. ..................................................... 119/23
[58] Field of Search .......................... 119/23; 220/212

[56] References Cited

U.S. PATENT DOCUMENTS

| | | | |
|---|---|---|---|
| 388,385 | 8/1888 | Wooster | 119/23 X |
| 1,987,347 | 1/1935 | Moore | 119/23 |
| 2,077,208 | 4/1937 | Brady | 119/23 |

FOREIGN PATENT DOCUMENTS 949406 6/1974 Canada .................................... 119/23

Primary Examiner—Hugh R. Chamblee
Attorney, Agent, or Firm—Kenneth E. Darnell

[57] ABSTRACT

The present invention provides a storage container which is convertible into a bird nesting box, the container preferably having a snap-on lid or cover and being commonly available as a disposable receptacle for the packaging of consumable powders, granular materials or other food stuffs such as instant soft drinks, coffee, and the like. The container and the snap-on cover are provided with pre-stressed portions which can be readily removed, a measuring cup such as typically provided within such a container also having a pre-stressed portion thereof which can be removed to form a cylindrical sleeve-like member open at both ends. The measuring cup is further provided with spaced flanges or threads on the exterior surface thereof which can be fitted within the aperture formed on removal of the pre-stressed portion on the snap-on cover to hold the cup therein, the container forming a suitable nesting box on placement of the cover and cup assembly on the open end thereof. The handle of the measuring cup is further pivotable about its point of connection to the cup to provide a perch outside the entrance opening formed by the aforesaid aperture in the cover and the cylindrical cup.

8 Claims, 6 Drawing Figures

METHOD FOR CONVERTING A DISPOSABLE STORAGE CONTAINER TO A BIRD NESTING BOX AND ARTICLES OF MANUFACTURE ASSOCIATED THEREWITH

BACKGROUND AND SUMMARY OF THE INVENTION

Nesting boxes and houses for birds have previously been provided in the act. Such boxes have taken forms, most being of the square or rectangular box type. However, Moore in U.S. Pat. No. 1,987,347 disclosed the use of a metallic cylinder having a removable friction disc or plug member engageable with an open end of the cylinder, the member having an aperture formable centrally therein to provide an entrance opening for birds nesting in the cylindrical enclosure. These prior bird boxes, including the Moore structure, could be fabricated only with some expenditure of money and time in obtaining the necessary materials and forming said materials into the required shapes for assembly into a desired structure. Even when commonly available materials, such as milk cartons and the like, are cleverly converted into nesting houses, a substantial amount of time and talent is required to properly form such an enclosure into a desired conformation. Further, additional materials must always be procured to form necessary structural features, such as a perch, of an acceptable nesting box. Further, cutting implements such as scissors, knives, saws, or the like must usually be used to accomplish the fabrication techniques employed to produce the nesting boxes invisioned by the prior art. The fabrication of these prior act nesting boxes have thus required some degree of skill, the use of the tools or implements necessary to manufacture such boxes being typically unsafe for utilization by children. The cost in time and money of these prior bird boxes have also tended to limit the number of such boxes which bird-loving individuals and families could manage to build for deployment in yards and woodlands.

The present invention provides a bird nesting box which can be fabricated at minimal cost both in terms of financial and temporal expenditure, the present box being formed according to the presently disclosed method from a disposable storage container such as is commonly used in the marketing of food stuffs and other products. The use of the disposable storage container as a bird box provides a further societal benefit in that the container is put to a desirable purpose rather than being discarded and thus aggravating the already overwhelming community solid waste disposal problem. The disclosure made herein includes an article of manufacture useable in the manner of a disposable storage container for packaging of a product which is to be sold such as from a display shelf in a food store. The present article of manufacture particularly finds utility in the packaging of powder or granular materials which are mixed with a liquid such as water to form a beverage. Presently available metal or composite containers of this type are typically cylindrical and have a measuring cup provided in the container for convenient preparation of the foodstuff. Such containers further have plastic snap-on covers which, on removal of an inner metal or composite sealing wall, serve as a replaceable lid to prevent spillage and spoilage of the food stuff. According to the present invention, the container, the cover, and the measuring cup are provided with pre-stressed, typically circular portions which can be "punched out" to provide aperture or openings of a predetermined size, the openings thus formed the container being typically of a diameter sufficient to provide ventilation. A central opening is thereby formed in the cover to receive the cylindrical cup portion of the measuring cup therein, the cup being locked in the opening by means of spaced snap flanges on screw threads formed on the external surface of the cup. The bottom of the measuring cup is "punched out" to provide an entrance opening for a bird into the interior of the container. Further, the handle of the measuring cup can be bent to provide a perch.

The bird nesting box formed according to the invention provides the advantages and features typically desired of a nest housing, that is, the present box can be installed in trees, on posts, and even on the walls of sheds, barns, or other structures. Further, the present nesting box provides protection against predators as well as against the elements. Due to the exceptionally low cost of the present bird box and the ease of fabrication thereof especially when an otherwise disposable storage container is configured for conversion to said bird box as aforesaid, great numbers of the box can be economically fabricated and installed for the benefit of the birds and for the enjoyment and recreational benefit of those who fabricate the boxes. Children can especially benefit from the invention due to the ease of fabrication of the present bird box, dangerous tools and cutting implements not being necessary for conversion of the storage container to the finished bird box. The present bird box can be fabricated largely by hand, a simple hand punch which can take the form of a pencil or dowel rod being typically useable to form the ventilation holes in the container. The present bird box can therefore be economically and safely fabricated by children as well as by adults, the box being either built from a container which is predisposed to conversion or from a container such as was available before the invention disclosed herein.

Accordingly, it is an object of the invention to provide a nesting box and a method of manufacturers thereof for use by birds which is inexpensive to fabricate and which can be fabricated from otherwise disposable storage containers such as are used to package "instant" beverages and the like.

It is a further object of the invention to provide an otherwise disposable storage container for packaging food stuffs such as "instant" beverages and the like which is preformed for ready conversion into a bird nesting box at minimal cost and without the need for skillful use of tools or cutting implements, the conversion being readily accomplished by childred or individuals who are not mechanically inclined.

Further objects and advantages of the invention will become more apparent in light of the following detailed description of the preferred embodiments of the invention.

DESCRIPTION OF THE PREFERRED EMBODIMENTS

Figure 1:
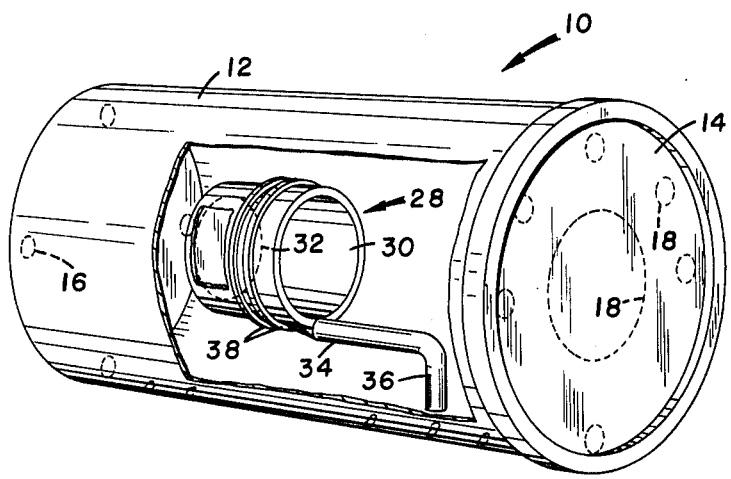
FIG. 1 is a perspective view of apparatus embodying the invention, the apparatus being shown partially cutaway.
Figure 2:
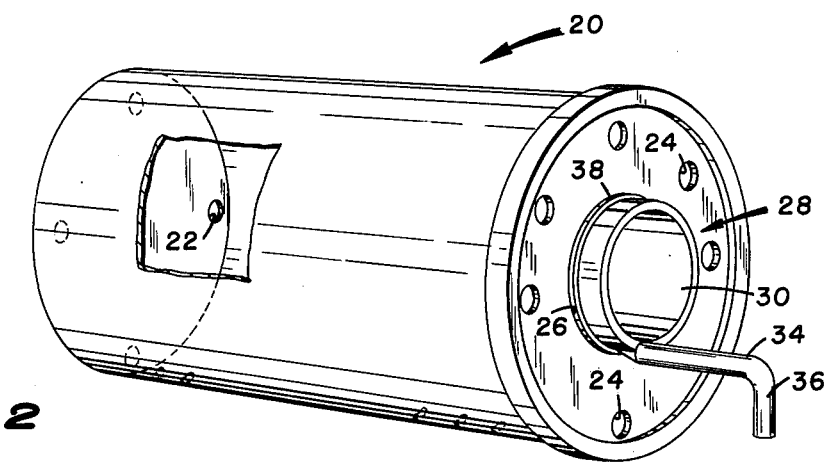
FIG. 2 is a perspective view of apparatus embodying the invention in an arrangement converted from the configuration of FIG. 1.

Referring to the drawing and particularly to FIGS. 1 and 2, the invention is seen to comprise a storage container shown generally at 10 in FIG. 1 and which is convertible by the method of the invention to a bird nesting box such as is shown generally at 20 in FIG. 2. The storage container 10 is preferably of a disposable type commonly used to hold powders or granular materials during display prior to sale and during use of the contained material after sale. The storage container 10 preferably comprises a cylindrical can 12 open at one end, the open end of the can 12 typically having an annular lip (not shown) formed about the periphery thereof for facilitating the press fit of a plastic cover or lid 14 thereto. The can 12 has indentations or scorings 16 formed in selected locations on the closed end and on the cylindrical surface thereof, the scorings 16 being disposed in a pattern such as about the circumference of a circle. The scorings 16 weaken the material in which said scorings are disposed such that the material circumscribed by the scorings 16 can be readily punched or otherwise removed from the can 12 to form ventilation holes, such as the holes 22 in the bird nesting box 20 of FIG. 2, when the material stored in the container 10 is removed.

The lid 14 has a plurality of indentations or scorings 18 formed on the planar face thereof, a portion of the scorings 18 defining small circles or other enclosed geometric figures which, when the material circumscribed thereby is removed, form ventilation holes, such as the ventilation holes 24 in the lid 14 of the bird nesting box 20 of FIG. 2. The remainder of the scorings 18 define a relatively larger circle or other geometric figure which can be centrally located on the planar face of the lid 14. When the material circumscribed by the larger circle of scorings 18 is removed from the lid 14, an access opening 26 is formed in said lid, the opening 26 being useful as will be described hereinafter.

The can 12 is cut-away for illustrative purposes only as seen in FIG. 1 to show a material scoop 28 located within said can, the scoop 28 being used in a conventional manner to measure quantities of the material usually stored within the container 10. FIGS. 3,4 and FIGS. 5, 6 show alternative embodiments 40 and 50 of the scoop which could be used in the practice of the invention. The scoop 28 is seen to be formed of a cylindrical cup portion 30 which is open at one end thereof and closed at the other end thereof. The closed end of the cup portion 30 has scorings 32 or other means formed therein which preferably circumscribe virtually the entire closed end of said cup portion, the scorings 32 weakening the material of which the cup portion 30 is formed to allow the material circumscribed by said scorings to be easily separated from the cup portion 30. The cup portion 30 is further seen to have a handle member 34 attached thereto, preferably at the periphery of the open end of the cup portion 30. Although the handle member 34 can take forms other than that shown in FIG. 1 (as evidenced by the structures shown in FIGS. 3-6), the handle member 34 can be attached to or formed with the cup portion 30 as a laddle-like or dipper-like handle, the longitudinal axis of the major portion of the handle member 34 extending from the open end of the cup portion 30 in parallel relation to the longitudinal axis of said cylindrical cup portion 30. The handle member 34 can preferably recurve laterally at the distal end thereof to form a grip 36 which facilitates use of the scoop 28.

The scoop 28 is further seen to have a pair of spaced parallel rings 38 formed on the external surface of the cup portion 30, the rings 38 being spaced apart a predetermined distance substantially equal to or slightly greater than the thickness of the material forming the planar face portion of the lid 14. The planes in which the rings 38 lie are effectively perpendicular to the longitudinal axis of the cylindrical cup portion 30.

When the material stored within the container 10 is removed, such as by being measured out through use of the scoop 28, the portions of the material forming the can 12, lid 14, and scoop 28 circumscribed by the scorings 16, 18 and 32 respectively are separated or otherwise removed to form openings, such as the ventilation holes 22 and 24 and the access opening 26 in the lid 14. The cup portion 30 of the scoop 28 is thus caused to take the form of a cylindrical tube open at both ends on removal of the material circumscribed by the scorings 32. The access opening 26 formed in the lid 14 is of a diameter which is substantially equal to or slightly greater than the external diameter of the cylindrical cup portion 30 of the scoop 28, the outer diameter of the spaced rings 38 being greater than the diameter of the access opening 26. The end portion of the cylindrical cup portion 30 opposite the handle member 34 is inserted into the access opening 26 in the lid 14 a distance sufficient to cause the lowermost of the rings 38 to snap through the opening 26, the lid 14 typically being formed of a flexible plastic material which allows snap fitting of the ring 38 through said opening 26. Thus, one each of the rings 38 are caused to lie on either planar face of the lid 14, the cylindrical cup portion 30 being thereby held in the access opening 26. The cup portion 30, which is now open at both ends as aforesaid, allows communication of the interior of the cylindrical can 12 with ambient. The cup portion 30 can be rotated to position the handle member 34 at a desired location, the handle member 34 serving as a perch for a bird using the assembly 20 of FIG. 2 as a bird nesting house. As seen in FIG. 2, the bird nesting box 20 is comprised of structure converted from the storage container 10 of FIG. 1, no additional structure or materials being necessary to structural completion of the bird nesting box 20. The enclosed housing portion of the box 20 is seen to be comprised of the cylindrical can 12 and the lid 14, the lid 14 removably snap-fitting onto the can 12 in a well-known manner. The scoop 28, with the material circumscribed by the scorings 32 removed, forms a cylindrical entrance way open at both ends and having a perch comprised by the handle member 34 of the scoop 28. Ventilation holes 22 and 24 in the can 12 and the lid 14 respectively provide for maintenance of a desirable environment within the bird nesting box 20.

Figures 3, 4, 5, 6:
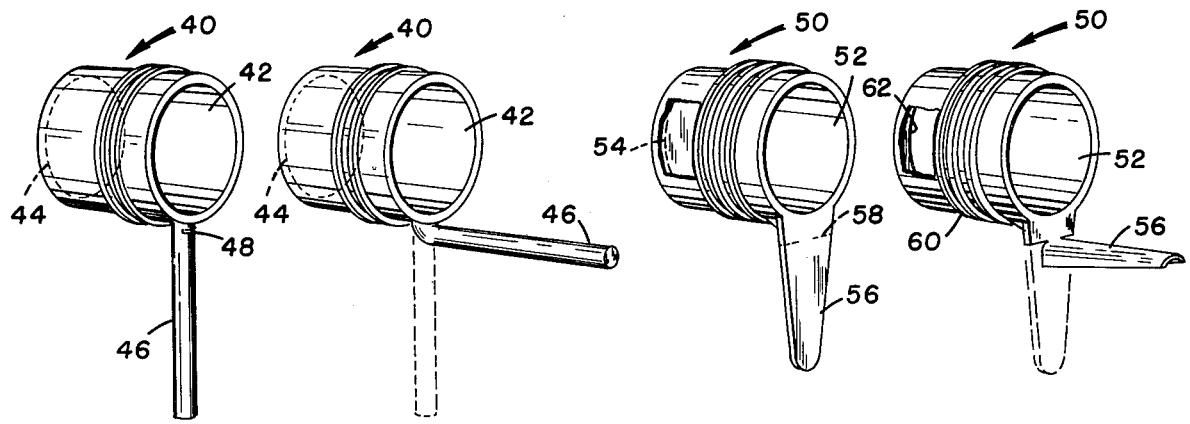
FIG. 3 is a perspective view of a second embodiment of a portion of the apparatus of the invention.
FIG. 4 is a perspective view of the embodiment of FIG. 3 in a reconfigured mode.
FIG. 5 is a perspective view of a third embodiment of a portion of the apparatus of the invention.
FIG. 6 is a perspective view of the embodiment of of FIG. 5 in a reconfigured mode.

FIGS. 3-6 illustrate alternate embodiments of the scoop 28, scoops 40 and 50 being respectively shown in FIGS. 3, 4 and FIGS. 5,6. The scoop 40 is formed similarly to the scoop 28, the scoop 40 comprising a cylindrical cup portion 42 being open at one end and closed at the other end. The closed end has scorings 44 defining a circle in the manner described relative to the scoop 28. The scoop 40 further has a handle member 46 which, when disposed within the storage container 10 for use as a measuring implement, has its longitudinal axis disposed perpendicular to the longitudinal axis of the cylindrival cup portion 42. The handle member 46 can be provided with a notch 48 at or near the juncture thereof with the cup portion 42, the notch 48 facilitating the bending of the handle member 46 as shown in FIG. 4 to a position wherein the longitudinal axis of the handle member 46 is parallel to the longitudinal axis of the cylindrical cup portion 42, the handle member 46 thereby serving as a perch whent the modified scoop 40 of FIG. 4 inserted into the access opening 26 of the lid 14 in manner identical to that described relative to the scoop 28 in FIG. 2.

The scoop 50 of FIG. 5 and 6 is also formed similarly to the scoop 28, the scoop 50 comprising a cylindrical cup portion 52 being open at one end and closed at the other end. The closed end of the cup portion 52 has scorings 54 defining a circle in the manner described relative to the scoops 28 and 40. The scoop 50 further has a handle member 56 which can be serrated at 58 to allow at least a distal postion of the handle member 56 to be bent outwardly in a manner similar to that described relative to the scoop 40. The handle member 46 of the scoop 40 differing primarily from the handle member 56 of the scoop 50 by virtue of the fact that the handle member 46 is essentially a cylindrical solid while the handle member 56 is arcuate in cross-section with the proximal end portion being thicken laterally than the distal end portion, the member 56 tapering from the proximal end thereof to the distal end. The scoop 50 is seen to be partially cut-away in FIGS. 5 and 6, to illustrate (in FIG. 5) the scorings 54 prior to removal of the material circumscribed thereby and to illustrate (in FIG. 6) an opening 62 disposed in the scoop 50 when said material is removed from the once closed end of the cup portion 52. The scoop 50 is seen to differ from the scoops 28 and 40 in that a spiraling pattern of threads 60 is formed on the external surface of the cylindrical cup portion 52, the raised threads 60 being of an outer diameter greater than the diameter of the access opening 26 of the lid 14 while the outer diameter of the cup portion 52 is essentially equal to or slightly less than the diameter of the access opening 26. Thus, the scoop 50 of FIG. 6 can be secured within the access opening 26 by rotation of the threads 60 within said access opening to "screw" the scoop 50 thereinto. Thus, it can be seen that alternate forms of connection between the scoop and the lid 14 can be used to secure the scoop within the access opening 26 of the lid.

The materials from which the present structures can be formed vary. The can 12 can be formed of metal, various plastics, or other materials suitable to withstand ordinary environmental effects. The lid 14 preferably is comprised of a flexible plastic material such as is commonly used in storage container of this type. The scorings 16, 18 and 32 can be formed in a variety of known ways, the scorings being adapted to leave the scored material in a condition whereby the intended function of the structure can be performed prior to removal of the material circumscribed by the scorings. The scorings could take the form of continuous prestressed arcuate lines in a known manner. The scoops 28, 40 and 50 can also be formed in a variety of shapes, the scoops possibly being square in longitudinal cross-section and having spaced rings formed thereon which are received into a square access opening in the lid 14 in a manner analogous to that described herein above. The handle members 34, 46 and 56 can also be formed in ways other than those specifically pointed out. The structure used for attachment of the opened scoop to the access opening is also susceptible to variation, the scoop possibly not having spaced rings or threads but being simply friction fit into the access opening. Alternatively, the rings 38 or threads 60 need not be continuous about the cup portions of the scoops in order to provide an attachment of the scoops within the access opening 26. As a further alternative, the present storage container 10 can be provided with a perch member which is insertable into the lid 14 at a location about the periphery of the access opening 26, the perch member preferably comprising a cylindrical bar-like solid having a proximal end portion which is fitted into a small opening in the lid 14, the opening being formable in the manner of the ventilation holes 24.

Accordingly, it can be seen that the practice of the present method and article of manufacture can vary considerably within the scope of the teachings hereby provided the invention to be limited therefore only by the recitations of the appended claims.

What is claimed is:
1. A method for converting a storage container to a bird nesting box, the storage container being of the type which typically holds a granular-type substance and which is sealably closed at one end by means of a snap-fit lid, the storage container having a scoop disposed therein, which scoop includes a handle member extending therefrom, the method comprising the steps of:
   defining an enclosed geometrical shape in the planar surface of the lid;
   weakening the material of which the lid is formed above the perimeter of the geometrical shape;
   subsequently removing the material of the lid included within the perimeter of the geometrical shape to form an access opening;
   defining an enclosed geometrical shape in the closed end of the scoop;
   weakening the material of which the scoop is formed about the perimeter of the geometrical shape;
   subsequently removing the material of the scoop included within the perimeter of the geometrical shape to form with the open end of the scoop a longitudinal channel in the scoop;
   fitting the scoop into the access opening in the lid with the longitudinal axis of the longitudinal channel being substantially perpendicular to the plane in which the lid is disposed; and
   locating the handle member on the scoop to cause at least a portion of the longitudinal axis of said handle member to extend substantially perpendicular to the plane in which the lid is disposed, the portion of the handle member serving as a perch and the longitudinal channel in the scoop serving as an entrance way into the interior of the bird nesting box.

2. The method of claim 1 wherein the last-mentioned step comprises the step of:
   deforming at least a portion of the handle member to cause the longitudinal axis of said portion to extend substantially perpendicular to the plane in which the lid is disposed.

3. The method of claim 1 and further comprising the steps of:
   defining enclosed geometrical shapes in the surfaces of the container and of the lid;

weakening the material of which the container and the lid are respectively formed about the perimeters of the geometrical shapes; and subsequently removing the material of the container and of the lid included within the perimeters of the geometrical shapes to form ventilation holes.

4. The method of claim 1 wherein the geometrical shape defined in the lid is substantially identical to a section taken axially through the scoop, the access opening thereby being of a shape substantially identical to said axial section of said scoop.

5. The method of claim 2 wherein the geometrical shape defined in the lid is substantially circular.

6. The method of claim 1 wherein the step of fitting the scoop into the access opening comprises the following steps:

forming raised ridges on the external surface of the scoop between the ends thereof; and contacting the ridges with ridgeless perimetric surfaces periphery of the access opening to secure the scoop therein.

7. The method of claim 6 wherein the ridges are formed as two spaced parallel rings and the scoop is snap-fitted into the access opening.

8. The method of claim 6 wherein the ridges are formed as threads and the scoop is screwed into the access opening.

* * * * *